United States Patent
Manabe et al.

(10) Patent No.: US 7,369,991 B2
(45) Date of Patent: May 6, 2008

(54) SPEECH RECOGNITION SYSTEM, SPEECH RECOGNITION METHOD, SPEECH SYNTHESIS SYSTEM, SPEECH SYNTHESIS METHOD, AND PROGRAM PRODUCT HAVING INCREASED ACCURACY

(75) Inventors: Hiroyuki Manabe, Yokosuka (JP); Akira Hiraiwa, Yokohama (JP); Toshiaki Sugimura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 762 days.

(21) Appl. No.: 10/377,822

(22) Filed: Mar. 4, 2003

(65) Prior Publication Data
US 2003/0171921 A1    Sep. 11, 2003

(30) Foreign Application Priority Data
Mar. 4, 2002    (JP)    ............................ P2002-057818

(51) Int. Cl.
*G10L 15/00*    (2006.01)
(52) U.S. Cl. ........................................ 704/235; 704/236
(58) Field of Classification Search ................ 704/236, 704/235
See application file for complete search history.

(56) References Cited

U.S. PATENT DOCUMENTS

| | | | |
|---|---|---|---|
| 3,383,466 A | | 5/1968 | Hillix et al. |
| 4,769,845 A | * | 9/1988 | Nakamura .................. 704/231 |
| 4,862,503 A | * | 8/1989 | Rothenberg ................. 704/235 |
| 4,885,790 A | * | 12/1989 | McAulay et al. ........... 704/265 |
| 5,454,375 A | * | 10/1995 | Rothenberg ................. 600/538 |

(Continued)

FOREIGN PATENT DOCUMENTS

DE    42 12 907 A1    10/1993

(Continued)

OTHER PUBLICATIONS

Stefan Oberle, et al., "HMM-Based Speech Enhancement Using Pitch Period Information in Voiced Speech Segments", Proceedings of 1997 IEEE International Symposium on Circuits and Systems, vol. 4, XP-010236272, Jun. 9, 1997, pp. 2645-2648.

(Continued)

*Primary Examiner*—Michael Opsasnick
(74) *Attorney, Agent, or Firm*—Oblon, Spivak, McClelland, Maier & Neustadt, P.C.

(57) ABSTRACT

The object of the present invention is to keep a high success rate in recognition with a low-volume of sound signal, without being affected by noise.

The speech recognition system comprises a sound signal processor 10 configured to acquire a sound signal, and to calculate a sound signal parameter based on the acquired sound signal; an electromyographic signal processor 13 configured to acquire potential changes on a surface of the object as an electromyographic signal, and to calculate an electromyographic signal parameter based on the acquired electromyographic signal; an image information processor 16 configured to acquire image information by taking an image of the object, and to calculate an image information parameter based on the acquired image information; a speech recognizer 20 configured to recognize a speech signal vocalized by the object, based on the sound signal parameter, the electromyographic signal parameter and the image information parameter; and a recognition result provider 21 configured to provide a result recognized by the speech recognizer 20.

13 Claims, 13 Drawing Sheets

U.S. PATENT DOCUMENTS

| | | | |
|---|---|---|---|
| 5,512,834 A * | 4/1996 | McEwan | 324/642 |
| 5,522,013 A * | 5/1996 | Vanska | 704/255 |
| 5,573,012 A * | 11/1996 | McEwan | 600/595 |
| 5,717,828 A * | 2/1998 | Rothenberg | 704/251 |
| 5,729,694 A | 3/1998 | Holzrichter et al. | |
| 6,006,175 A * | 12/1999 | Holzrichter | 704/208 |
| 6,377,919 B1 * | 4/2002 | Burnett et al. | 704/231 |
| 6,381,572 B1 * | 4/2002 | Ishimitsu et al. | 704/246 |

FOREIGN PATENT DOCUMENTS

| | | |
|---|---|---|
| JP | 4-273298 | 9/1992 |
| JP | 6-12483 | 1/1994 |
| JP | 6-43897 | 2/1994 |
| JP | 7-181888 | 7/1995 |
| JP | 8-76792 | 3/1996 |
| JP | 8-187368 | 7/1996 |
| JP | 9-326856 | 12/1997 |
| JP | 10-123450 | 5/1998 |
| JP | 2000-57325 | 2/2000 |

OTHER PUBLICATIONS

A. D. C. Chan, et al., "Hidden Markov Model Classification of Myoelectric Signals in Speech", Proceedings of the 23$^{rd}$ Annual EMBS International Conference, Oct. 25-28, 2001, pp. 1727-1730.

Paul Duchnowski, et al., "See me, Hear me: Integrating Automatic Speech Recognition and Lip-Reading", ICSLP 94, Yokohama, XP-000600883, Sep. 18, 1994, pp. 547-550.

* cited by examiner

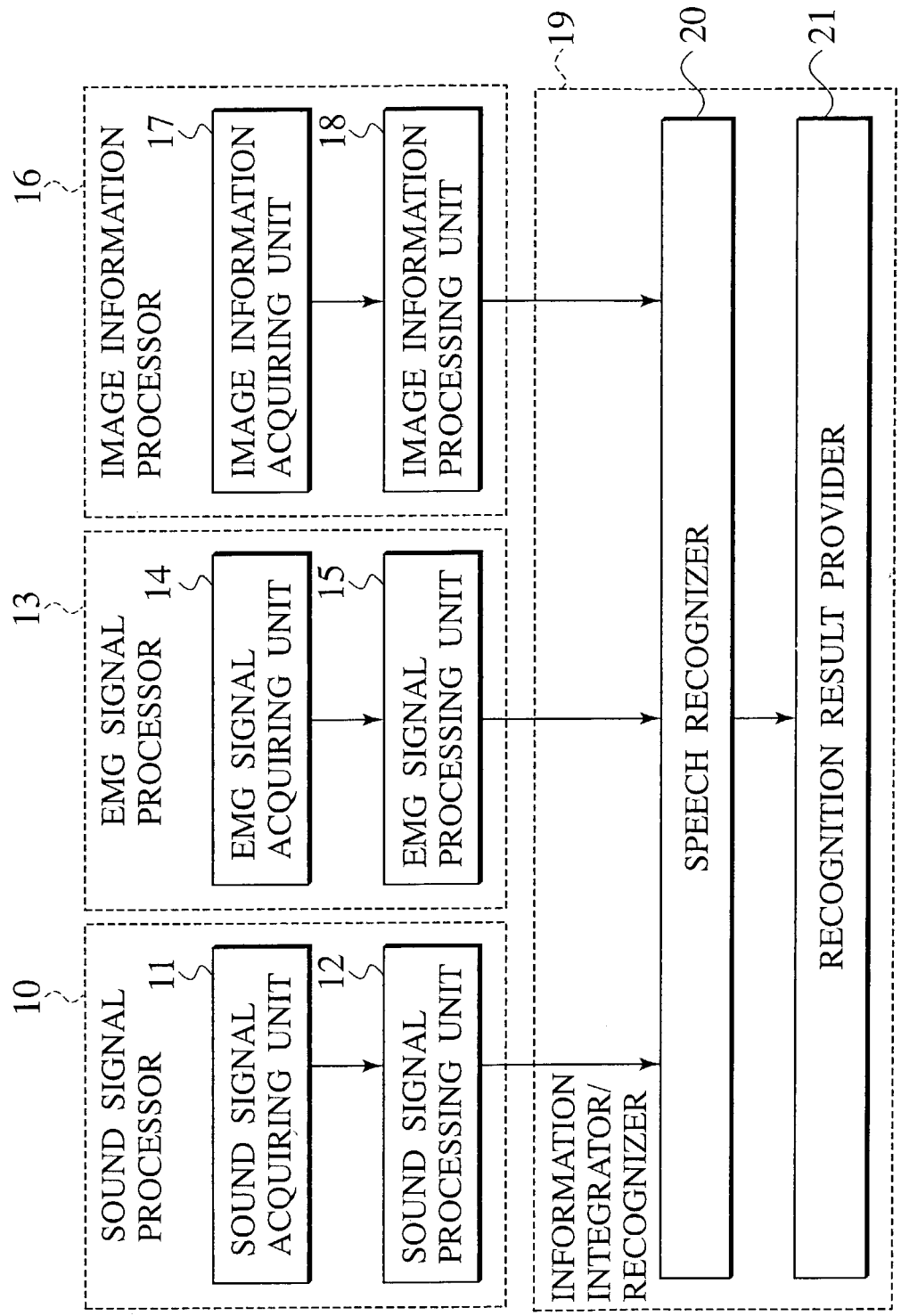

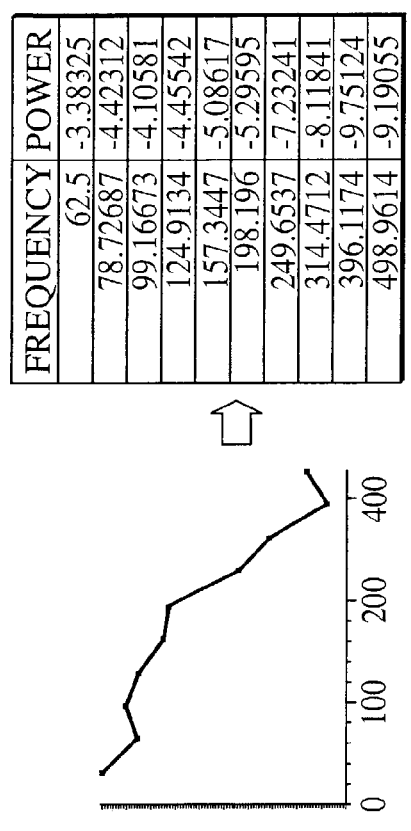
FIG.2A FIG.2B FIG.2C FIG.2D
| FREQUENCY | POWER |
|---|---|
| 62.5 | -3.38325 |
| 78.72687 | -4.42312 |
| 99.16673 | -4.10581 |
| 124.9134 | -4.45542 |
| 157.3447 | -5.08617 |
| 198.196 | -5.29595 |
| 249.6537 | -7.23241 |
| 314.4712 | -8.11841 |
| 396.1174 | -9.75124 |
| 498.9614 | -9.19055 |
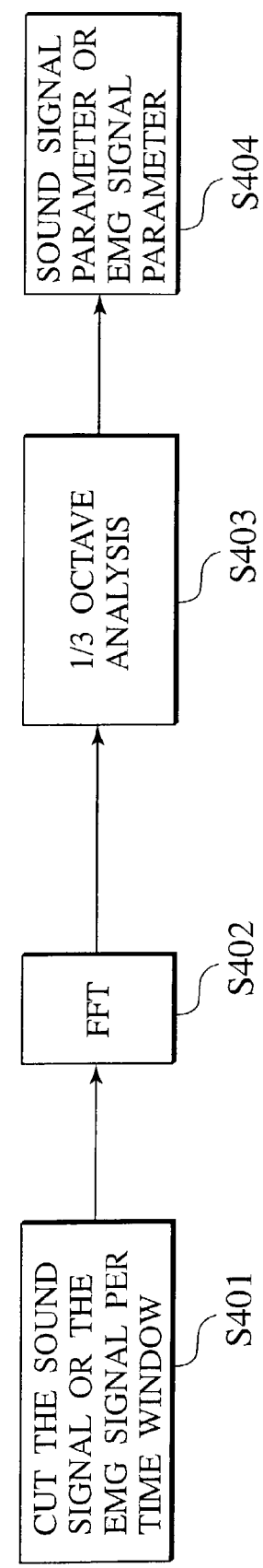
CUT THE SOUND SIGNAL OR THE EMG SIGNAL PER TIME WINDOW — S401
FFT — S402
1/3 OCTAVE ANALYSIS — S403
SOUND SIGNAL PARAMETER OR EMG SIGNAL PARAMETER — S404

FIG.3D

| POSITION | ① | ② | ③ | ④ | ⑤ | ⑥ | ⑦ | ⑧ |
|---|---|---|---|---|---|---|---|---|
| X COORDINATE | 1.1 | 2.3 | 0.5 | 3 | 2 | 2 | 1.2 | 2.1 |
| Y COORDINATE | 0.6 | 0.6 | 1.3 | 1.3 | 1.2 | 1.5 | 2.1 | 2.1 |
| Z COORDINATE | 0.4 | 0.4 | 0.1 | 0.1 | 0.4 | 0.5 | 0.4 | 0.4 |

| POSITION | ① | ② | ③ | ④ | ⑤ | ⑥ | ⑦ | ⑧ |
|---|---|---|---|---|---|---|---|---|
| DIFFERENCE IN X COORDINATE | 0 | 0 | 0 | 0 | 0 | 0 | 0 | 0 |
| DIFFERENCE IN Y COORDINATE | 0.1 | 0.1 | 0 | 0 | 0.1 | 0 | 0 | 0 |
| DIFFERENCE IN Z COORDINATE | 0.1 | 0.1 | 0 | 0 | -0.1 | 0 | 0 | 0 |

FIG.3C

DIFFERENCE($t_1 - t_0$)

| POSITION | ① | ② | ③ | ④ | ⑤ | ⑥ | ⑦ | ⑧ |
|---|---|---|---|---|---|---|---|---|
| X COORDINATE | 0 | 0 | 0 | 0 | 0 | 0 | 0 | 0 |
| Y COORDINATE | 0.1 | 0.1 | 0 | 0 | 0.1 | 0 | 0 | 0 |
| Z COORDINATE | 0.1 | 0.1 | 0 | 0 | -0.1 | 0 | 0 | 0 |

FIG.3B $t_1 (= t_0 + \Delta t)$

| POSITION | ① | ② | ③ | ④ | ⑤ | ⑥ | ⑦ | ⑧ |
|---|---|---|---|---|---|---|---|---|
| X COORDINATE | 1.1 | 2.3 | 0.5 | 3 | 2 | 2 | 1.2 | 2.1 |
| Y COORDINATE | 0.6 | 0.6 | 1.3 | 1.3 | 1.2 | 1.5 | 2.1 | 2.1 |
| Z COORDINATE | 0.4 | 0.4 | 0.1 | 0.1 | 0.4 | 0.5 | 0.4 | 0.4 |

FIG.3A $t_0$

| POSITION | ① | ② | ③ | ④ | ⑤ | ⑥ | ⑦ | ⑧ |
|---|---|---|---|---|---|---|---|---|
| X COORDINATE | 1.1 | 2.3 | 0.5 | 3 | 2 | 2 | 1.2 | 2.1 |
| Y COORDINATE | 0.5 | 0.5 | 1.3 | 1.3 | 1.1 | 1.5 | 2.1 | 2.1 |
| Z COORDINATE | 0.3 | 0.3 | 0.1 | 0.1 | 0.5 | 0.5 | 0.4 | 0.4 |

S501 — EXTRACT A FEATURE POSITION

S502 — EXTRACT A FEATURE POSITION

S503 — DETECT A MOTION OF THE FEATURE POSITION

S504 — IMAGE INFORMATION PARAMETER

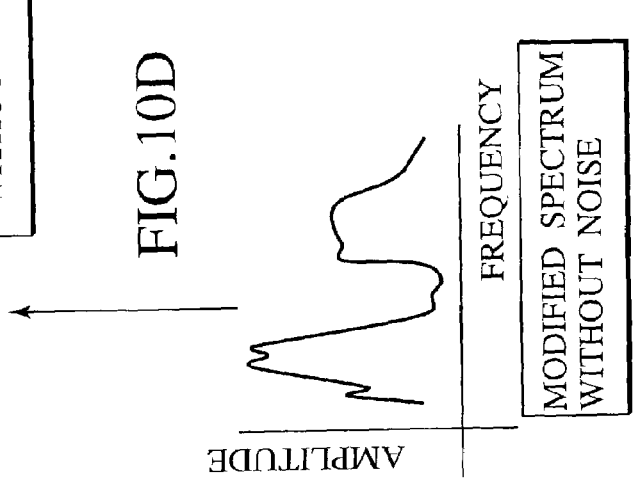
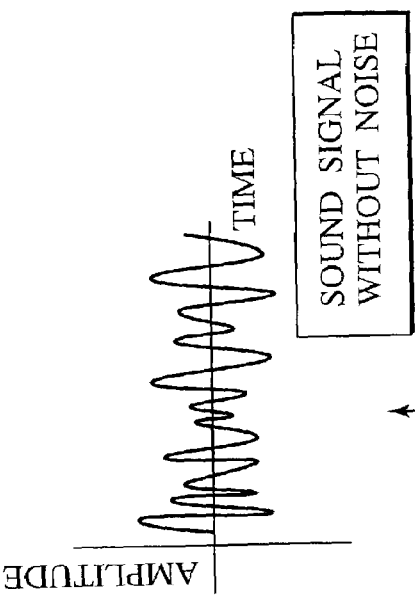
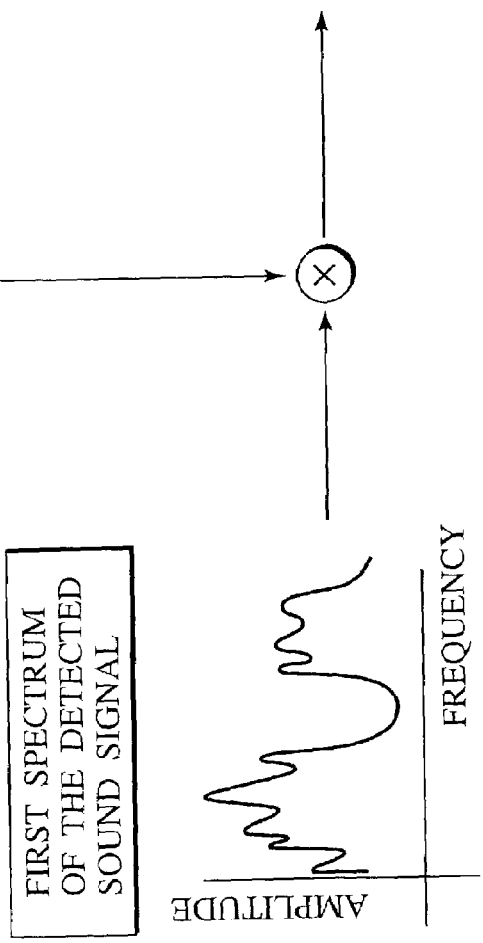

SPEECH RECOGNITION SYSTEM, SPEECH RECOGNITION METHOD, SPEECH SYNTHESIS SYSTEM, SPEECH SYNTHESIS METHOD, AND PROGRAM PRODUCT HAVING INCREASED ACCURACY

CROSS REFERENCE TO RELATED APPLICATION

This application is based upon and claims the benefit of priority from the prior Japanese Patent Application No. P2002-057818, filed on Mar. 4, 2002; the entire contents of which are incorporated herein by reference.

BACKGROUND OF THE INVENTION

1. Field of the Invention

The present invention relates to a speech recognition system and method for recognizing a speech signal, a speech synthesis system and method for synthesizing a speech signal in accordance with the speech recognition, and a program product for use therein.

2. Description of the Related Art

The conventional speech-detecting device adopts a speech recognition technique for recognizing and processing a speech signal by analyzing the frequencies included in a vocalized sound signal. The speech recognition technique is achieved using a spectral envelope or the like.

However, it is impossible for the conventional speech-detecting device to detect a speech signal without the vocalized sound signal that is inputted to the conventional speech-detecting device. Further, it is necessary for a sound signal to be vocalized at a certain volume, in order to obtain a good speech-detecting result using this speech recognition technique.

Therefore the conventional speech-detecting device cannot be used in a case where silence is required, for example, in an office, in a library, or in a public institution or the like, when a speaker may cause inconvenience to people around him/her. The conventional speech-detecting device has a problem in that a cross-talk problem is caused and the performance of the speech-detecting function is reduced in a high-noise environment.

On the other hand, research on a technique for acquiring a speech signal from information other than the sound signal is conducted conventionally. The technique for acquiring a speech signal from information other than a sound signal makes it possible to acquire a speech signal without a vocalized sound signal, so that the above problem can be solved.

The method of image processing based on image information inputted by a video camera is known as a method for recognizing a speech signal based on the visual information of the lips.

Further, the research on a technique for recognizing a type of vocalized vowel by processing an electromyographic (hereinafter, EMG) signal occurring together with the motion of muscles around (adjacent to) the mouth is conducted. The research is disclosed in the technical literature "Noboru Sugie et al., 'A speech Employing a Speech Synthesizer Vowel Discrimination from Perioral Muscles Activities and Vowel Production,' IEEE transactions on Biomedical Engineering, Vol.32, No.7, pp485-490" which shows a technique for discriminating five vowels "a, i, u, e, o" by passing the EMG signal through the band-pass filter and counting the number of times the passed EMG signal crosses the threshold.

The method for detecting the vowels and consonants of a speaker by processing the EMG signal with a neural network is known. Further a multi-modal interface that utilizes information inputted from not only an input channel but also a plurality of input channels has been proposed and achieved.

On the other hand, the conventional speech synthesis system stores data for characterizing the speech signal of a speaker, and synthesizes a speech signal using the data when the speaker vocalizes.

However, there is a problem in that the conventional speech detecting method using a technique for acquiring a speech signal from information other than a sound signal has a low success rate in recognition, in comparison with the speech detecting method using a technique for acquiring the speech signal from the sound signal. Especially, it is hard to recognize consonants vocalized by the motion of muscles in the mouth.

Further, the conventional speech synthesis system has a problem in that the speech signal is synthesized based on the data characterizing the speech signal of a speaker, so that the synthesized speech signal sounds mechanical, expression is not natural, and it is impossible to express the emotions of the speaker appropriately.

BRIEF SUMMARY OF THE INVENTION

In viewing of the foregoing, it is an object of the present invention to provide a speech recognition system and method, which achieves a high success rate in recognition with a low-volume of sound signal, without being affected by noise. It is another object of the present invention to provide a speech synthesis system and method, which synthesize the speech signal using the recognized speech signal, so as to make the synthesized speech signal more natural and clear, and to express the emotions of a speaker appropriately.

A first aspect of the present invention is summarized as a speech recognition system comprising a sound signal processor, an electromyographic (EMG) signal processor, an image information processor, a speech recognizer, and a recognition result provider.

The sound signal processor is configured to acquire a sound signal from an object, and to calculate a sound signal parameter based on the acquired sound signal. The EMG signal processor is configured to acquire potential changes on a surface of the object as an EMG signal, and to calculate an EMG signal parameter based on the acquired EMG signal. The image information processor is configured to acquire image information by taking an image of the object, and to calculate an image information parameter based on the acquired image information. The speech recognizer is configured to recognize a speech signal vocalized by the object, based on the sound signal parameter, the EMG signal parameter and the image information parameter. The recognition result provider is configured to provide a result recognized by the speech recognizer.

In the first aspect of the present invention, the speech recognizer may recognize a speech signal based on each of the sound signal parameter, the EMG signal parameter and the image information parameter, compare each of the recognized speech signals, and recognize the speech signal based on the compared result.

In the first aspect of the present invention, the speech recognizer may recognize the speech signal using the sound signal parameter, the EMG signal parameter and the image information parameter simultaneously.

In the first aspect of the present invention, the speech recognizer may comprise a hierarchical network in which a plurality of non-linear components comprising an input unit and an output unit are located from upstream to downstream hierarchically. The output unit of the upstream non-linear component is connected to the input unit of the downstream non-linear component within adjacent non-linear components. A weight value is assigned to the connection or a combination of the connections. Each of the non-linear components calculates data which is outputted from the output unit and determines the connection to which the calculated data is outputted, in accordance with data inputted to the input unit and the weight value assigned to the connection or the combinations. The sound signal parameter, the EMG signal parameter and the image information parameter are inputted to the most upstream non-linear components in the hierarchical network as the inputted data. The recognized speech signals are outputted from the output unit of the most downstream non-linear components in the hierarchical network as the outputted data. The speech recognizer recognizes the speech signal based on the outputted data.

In the first aspect of the present invention, the speech recognizer may comprise a learning function configured to change the weight assigned to the non-linear components by inputting sampling data which is transferred from downstream to upstream.

In the first aspect of the present invention, the sound signal processor may comprise a microphone configured to acquire the sound signal from a sound source. The microphone is configured to communicate with a communications device. The EMG signal processor may comprise electrodes configured to acquire the potential changes on a surface around the sound source as the EMG signal. The electrodes are installed on a surface of the communications device. The image information processor may comprise a camera configured to acquire the image information by taking an image of the motion of the sound source. The camera is installed at a terminal separated from the communications device. The communications device transmits and receives data with the terminal.

In the first aspect of the present invention, the terminal may comprise a body on which the camera is installed, and a belt for fixing the body. The recognition result provider may be a display for displaying the result, the display being installed on the surface of the body.

In the first aspect of the present invention, the system may comprise a positioning device and a holding device. The sound signal processor may comprise a microphone configured to acquire the sound signal from a sound source. The EMG signal processor may comprise electrodes configured to acquire the potential changes on a surface around the sound source as the EMG signal. The image information processor may comprise a camera configured to acquire the image information by taking an image of the motion of the sound source. The positioning device may fix the microphone and the electrodes adjacent to the sound source. The holding device may hold the camera and the positioning device.

In the first aspect of the present invention, the recognition result provider may display the result in a translucent display. The recognition result provider is installed in the holding device.

A second aspect of the present invention is summarized as a speech synthesis system comprising a speech recognizer, a sound signal acquirer, a first spectrum acquirer, a second spectrum generator, a modified spectrum generator, and an outputter.

The speech recognizer is configured to recognize a speech signal. The sound signal acquirer is configured to acquire a sound signal. The first spectrum acquirer is configured to acquire a spectrum of the acquired sound signal as a first spectrum. The second spectrum generator is configured to generate a reconfigured spectrum of the sound signal, based on the speech signal recognized by the speech recognizer, as a second spectrum. The modified spectrum generator is configured to generate a modified spectrum in accordance with the first spectrum with the second spectrum. The outputter is configured to output a synthesized speech signal based on the modified spectrum.

In the second aspect of the present invention, the outputter may comprise a communicator configured to transmit the synthesized speech signal as data.

A third aspect of the present invention is summarized as a speech recognition method comprising the steps of: (A) acquiring a sound signal from an object, and calculating a sound signal parameter based on the acquired sound signal; (B) acquiring potential changes on a surface of the object as an EMG signal, and calculating an EMG signal parameter based on the acquired EMG signal; (C) acquiring image information by taking an image of the object, and calculating an image information parameter based on the acquired image information; (D) recognizing a speech signal vocalized by the object, based on the sound signal parameter, the EMG signal parameter and the image information parameter; and (E) providing a result recognized by the speech recognizer.

In the third aspect of the present invention, the step (D) may comprise the steps of: (D1) recognizing a speech signal based on each of the sound signal parameter, the EMG signal parameter and the image information parameter; (D2) comparing each of the recognized speech signals; and (D3) recognizing the speech signal based on the compared result.

In the third aspect of the present invention, the speech signal may be recognized by using the sound signal parameter, the EMG signal parameter and the image information parameter simultaneously, in the step (D).

In the third aspect of the present invention, a plurality of non-linear components comprising an input unit and an output unit may be located from upstream to downstream hierarchically in a hierarchical network. The output unit of the upstream non-linear component is connected to the input unit of the downstream non-linear component within adjacent non-linear components. A weight value is assigned to the connection or a combination of the connections. Each of the non-linear components calculates data outputted from the output unit and determines the connection to which the calculated data is outputted, in accordance with data inputted to the input unit and the weight value assigned to the connection or the combinations. The step (D) comprises the steps of: (D11) inputting the sound signal parameter, the EMG signal parameter and the image information parameter into the most upstream non-linear components in the hierarchical network as the inputted data; (D12) outputting the recognized speech signal from the output unit of the most downstream non-linear components in the hierarchical network as the outputted data; and (D13) recognizing the speech signal based on the outputted data.

In the third aspect of the present invention, the method may comprise the step of changing the weight assigned to the non-linear components by inputting sampling data which is transferred from downstream to upstream.

A fourth aspect of the present invention is summarized as a speech synthesis method comprising the steps of: (A) recognizing a speech signal; (B) acquiring a sound signal; (C) acquiring a spectrum of the acquired sound signal as a first spectrum; (D) generating a reconfigured spectrum of the sound signal, based on the speech signal recognized by the speech recognizer, as a second spectrum; (E) generating a modified spectrum in accordance with the first spectrum with the second spectrum; and (F) outputting a synthesized speech signal based on the modified spectrum.

In the fourth aspect of the present invention, the step (F) may comprise a step of transmitting the synthesized speech signal as data.

A fifth aspect of the present invention is summarized as a program product for recognizing a speech signal in a computer. The computer executes the steps of: (A) acquiring a sound signal from an object, and calculating a sound signal parameter based on the acquired sound signal; (B) acquiring potential changes on a surface of the object as an EMG signal, and calculating an EMG signal parameter based on the acquired EMG signal; (C) acquiring image information by taking an image of the object, and calculating an image information parameter based on the acquired image information; (D) recognizing a speech signal vocalized by the object, based on the sound signal parameter, the EMG signal parameter and the image information parameter; and (E) providing a result recognized by the speech recognizer.

In the fifth aspect of the present invention, the step (D) may comprise the steps of: (D1) recognizing a speech signal based on each of the sound signal parameter, the EMG signal parameter and the image information parameter; (D2) comparing each of the recognized speech signals; and (D3) recognizing the speech signal based on the compared result.

In the fifth aspect of the present invention, the speech signal may be recognized by using the sound signal parameter, the EMG signal parameter and the image information parameter simultaneously, in the step (D).

In the fifth aspect of the present invention, a plurality of non-linear components comprising an input unit and an output unit are located from upstream to downstream hierarchically in a hierarchical network. The output unit of the upstream non-linear component is connected to the input unit of the downstream non-linear component within adjacent non-linear components. A weight value is assigned to the connection or a combination of the connections. Each of the non-linear components calculates data outputted from the output unit and determines the connection to which the calculated data is outputted, in accordance with data inputted to the input unit and the weight value assigned to the connection or the combinations. The step (D) comprises the steps of: (D11) inputting the sound signal parameter, the EMG signal parameter and the image information parameter into the most upstream non-linear components in the hierarchical network as the inputted data; (D12) outputting the recognized speech signals from the output unit of the most downstream non-linear components in the hierarchical network as the outputted data; and (D13) recognizing the speech signal based on the outputted data.

In the fifth aspect of the present invention, the computer may execute the step of changing the weight assigned to the non-linear components by inputting sampling data which is transferred from downstream to upstream.

A sixth aspect of the present invention is summarized as a program product for synthesizing a speech signal in a computer. The computer executes the steps of: (A) recognizing a speech signal; (B) acquiring a sound signal; (C) acquiring a spectrum of the acquired sound signal as a first spectrum; (D) generating a reconfigured spectrum of the sound signal, based on the speech signal recognized by the speech recognizer, as a second spectrum; (E) generating a modified spectrum in accordance with the first spectrum with the second spectrum; and (F) outputting a synthesized speech signal based on the modified spectrum.

In the sixth aspect of the present invention, the step (F) may comprise a step of transmitting the synthesized speech signal as data.

BRIEF DESCRIPTION OF THE SEVERAL VIEWS OF THE DRAWINGS

FIG. 1 is a functional block diagram of a speech recognition system according to an embodiment of the present invention.

FIGS. 2A to 2D is an example of a process for extracting a sound signal and an EMG signal in the speech recognition system according to the embodiment of the present invention.

FIGS. 3A to 3D is an example of a process for extracting image information in the speech recognition system according to the embodiment of the present invention.

FIGS. 10A to 10D is a diagram for explaining the operation of a noise-removing process in the speech synthesis system according to the embodiment of the present invention.

Figure 4:
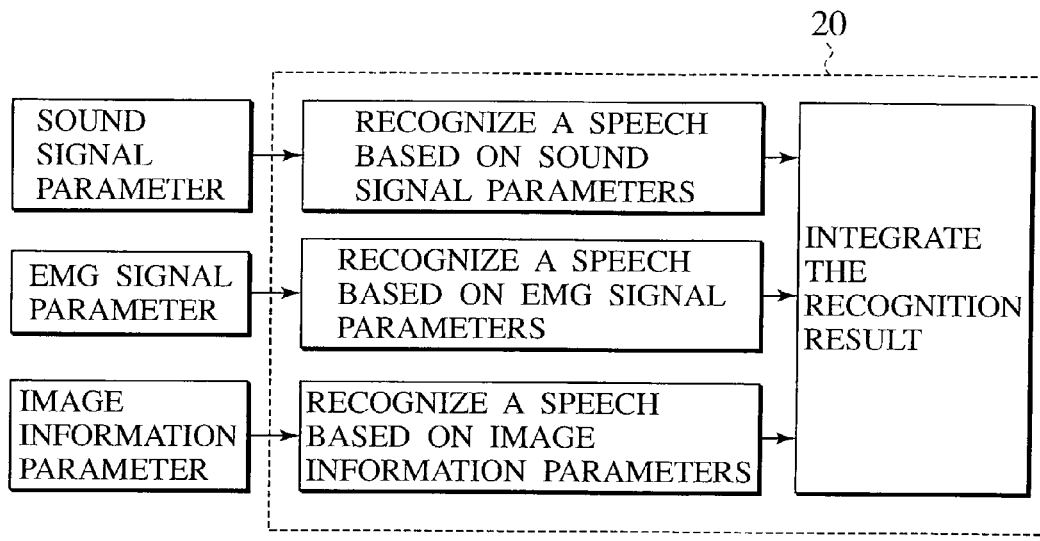
FIG. 4 is a functional block diagrams of the speech recognizer in the speech recognition system according to the embodiment of the present invention.

DETAILED DESCRIPTION OF THE INVENTION (Configuration of a Speech Recognition System According to a First Embodiment of the Present Invention)

A configuration of a speech recognition system according to a first embodiment of the present invention will be described in detail below. FIG. 1 illustrates a functional block diagram of the speech recognition system according to the embodiment.

As shown in FIG. 1, the speech recognition system is configured with a sound signal processor 10, an EMG signal processor 13, an image information processor 16, an information integrator/recognizer 19, a speech recognizer 20, and a recognition result provider 21.

The sound signal processor 10 is configured to process the sound signal vocalized by a speaker. The sound signal processor 10 is configured with a sound signal acquiring unit 11 and a sound signal processing unit 12.

The sound signal acquiring unit 11 is a device for acquiring the sound signal from the mouth of a speaker (object), such as a microphone. The sound signal acquiring unit 11 detects the sound signal vocalized by the speaker, and transmits the acquired sound signal to the sound signal processing unit 12.

The sound signal processing unit 12 is configured to extract a sound signal parameter by separating a spectral envelope or a minute structure from the sound signal, acquired by the sound signal acquiring unit 11.

The sound signal processing unit 12 is a device for calculating the sound signal parameter, which can be processed in the speech recognizer 20, based on the sound signal acquired by the sound signal acquiring unit 11. The sound signal processing unit 12 cuts the sound signal per time-window set, and calculates the sound signal parameter by performing analyses which are used in speech recognition generally, such as short-time spectral analysis, Cepstrum analysis, maximum likelihood spectrum estimation method, covariance method, PARCOR analysis, and LSP analysis, on the cut sound signal.

The EMG signal processor 13 is configured to detect and process the motion of muscles around the mouth of a speaker when the sound signal is vocalized. The EMG signal processor 13 is configured with an EMG signal acquiring unit 14 and an EMG signal processing unit 15.

The EMG signal acquiring unit 14 is configured to acquire (extract) an EMG signal generated by the motion of muscles around the mouth of a speaker when a sound signal is vocalized. The EMG signal acquiring unit 14 detects potential changes on skin surfaces around the mouth of the speaker (object). That is to say, in order to recognize the activities of a plurality of muscles around the mouth which move in cooperation when a sound signal is vocalized, the EMG signal acquiring unit 14 detects a plurality of EMG signals from a plurality of electrodes on skin surfaces relating to the plurality of muscles, and amplifies the EMG signals to transmit to the EMG signal processing unit 15.

The EMG signal processing unit 15 is configured to extract an EMG signal parameter by calculating the power of the EMG signal acquired by the EMG signal acquiring unit 14 or analyzing the frequencies of the EMG signal. The EMG signal processing unit 15 is a device for calculating an EMG signal parameter based on a plurality of EMG signals transmitted from the EMG signal acquiring unit 14. To be more specific, the EMG signal processing unit 15 cuts the EMG signal per time-window set, and calculates the EMG signal parameter by calculating a feature of average amplitude, such as RMS (root mean square), ARV (average rectified value), or IEMG (integrated EMG).

Referring to FIGS. 2A to 2D, the sound signal processing unit 12 and the EMG signal processing unit 15 will be described in detail.

A sound signal or an EMG signal detected by the sound signal acquiring unit 11 or the EMG acquiring unit 14 is cut per time-window by the sound signal processor 11 or the EMG signal processor 15 (S401 in FIG. 2A). Next, spectrums are extracted from the cut signal with FFT (S402 in FIG. 2B). Then, the power of each frequency is calculated by performing a ⅓ analysis on the extracted spectrums (S403 in FIG. 2C). The calculated powers associated with each frequency are transmitted to the speech recognizer 20 as the sound signal parameters or the EMG signal parameters (S404 in FIG. 2D). The sound signal parameters or the EMG signal parameters are recognized by the speech recognizer 20.

It is possible for the sound signal processing unit 12 or the EMG signal processing unit 15 to extract the sound signal parameters or the EMG signal parameters by using methods other than the method shown in FIGS. 2A to 2D.

The image information processor 16 is configured to detect the spatial changes around the mouth of a speaker when a sound signal is vocalized. The image information processor 16 is configured with an image information acquiring unit 17 and an image information processing unit 18.

The image information acquiring unit 17 is configured to acquire image information by taking an image of the spatial changes around the mouth of a speaker (object) when a sound signal is vocalized. The image information acquiring unit 17 is configured with a camera for taking an image of the motion around the mouth of the speaker when the sound signal is vocalized, such as a video camera. The image information acquiring unit 17 detects the motion around the mouth as image information, and transmits the image information to the image information processing unit 18.

The image information processing unit 18 is configured to calculate a motion parameter around the mouth of the speaker (image information parameter), based on the image information acquired by the image information acquiring unit 17. To be more specific, the image information processing unit 18 calculates the image information by extracting a feature of the motion around the mouth with the optical flow.

Referring to FIGS. 3A to 3D, the image information processing unit 18 will be described in detail.

A feature position around the mouth of a speaker is extracted based on the image information at the time t0 (S501, in FIG. 3A). It is possible to extract the feature position around the mouth by extracting the position of a marker placed around the mouth as the feature position, or searching for the feature position within the shot image information. The image information processing unit 18 can extract the feature position as a two-dimensional position from the image information. The image information processing unit 18 can extract the feature position as a three-dimensional position by using a plurality of cameras.

Similarly, a feature position around the mouth is extracted at the time t1 after a lapse of dt from t0 (S502, in FIG. 3B). Then the image information processing unit 18 calculates the motion of each feature point by calculating a difference between the feature point at the time t0 and the feature point at the time t1 (S503, in FIG. 3C). The image information processing unit 18 generates the image information parameters based on the calculated difference (S504, in FIG. 3D).

It is possible for the image information processing unit 18 to extract the image information parameters by using methods other than the method shown in FIGS. 3A to 3D.

The information integrator/recognizer 19 is configured to integrate and recognize various information acquired from the sound signal processor 10, the EMG signal processor 13 and the image information processor 16. The information integrator/recognizer 19 is configured with a sound recognizer 20 and a recognition result provider 21.

The sound recognizer 20 is a processor for recognizing speech by comparing and integrating the sound signal parameters transmitted from the sound signal processor 10, the EMG signal parameters transmitted from the EMG signal processor 13 and the image information parameters transmitted from the image signal processor 16.

The sound recognizer 20 can recognize a speech based on only the sound signal parameters, when the noise level is small in the surroundings, when the volume of a vocalized sound signal is large, or when a speech can be recognized at adequate levels based on the sound signal parameters.

On the other hand, the sound recognizer 20 can recognize speech based on not only the sound signal parameters but also the EMG signal parameters and the image information parameters, when the noise level is large in the surroundings, when the volume of a vocalized sound signal is small, or when speech cannot be recognized at adequate levels based on the sound signal parameters.

Further, the sound recognizer 20 can recognize specific phonemes or the like, which are not recognized correctly by using the EMG signal parameters and the image information parameters, by using only the sound signal parameters, so as to improve the recognition success rate.

Referring to FIG. 4, an example of the speech recognizer 20 will be described in detail. In the example shown in FIG. 4, the speech recognizer 20 recognizes a speech signal based on each of the sound signal parameter, the EMG signal parameter and the image information parameter, compares each of the recognized speech signals, and recognizes the speech signal based on the compared result.

As shown in FIG. 4, to be more specific, the speech recognizer 20 recognizes speech based on only the sound signal parameters, only the EMG parameters or only the image information parameters respectively. Then the speech recognizer 20 recognizes speech, by integrating the recognized results based on the respective parameters.

When the plurality of recognition results of (all recognized results) based on respective parameters are coincident with one another, the speech recognizer 20 regards this result as the final recognition result. On the other hand, when no recognition results (of all recognized results) based on respective parameters are coincident with one another, the speech recognizer 20 regards the recognition result which may have the highest success rate in recognition as the final recognition result.

For example, when it is known previously that speech recognition based on the EMG parameters has a low success rate in recognizing the specific phonemes or the specific patterns, and, according to the speech recognition based on parameters other than EMG signal parameters, it is assumed that the specific phonemes or the specific patterns are vocalized, the speech recognizer 20 ignores the recognized result based on the EMG signal parameters, so as to improve the recognition success rate in.

When, according to speech recognition based on the sound signal parameters, it is determined that noise level is large in the surroundings, or the volume of a vocalized sound signal is small, the speech recognizer 20 decreases the influence of the recognized result based on the sound signal parameters over the final recognition result, and recognizes speech by placing emphasis on the recognized result based on the EMG signal parameters and the image information parameters. Speech recognition based on the respective parameters can adopt the conventional speech recognition method.

Speech recognition based on the sound signal in the speech recognizer 20 can adopt the conventional speech recognition method using various sound signals. Speech recognition based on the EMG signal can adopt the method disclosed in the technical literature "Noboru Sugie et al., 'A speech Employing a Speech Synthesizer Vowel Discrimination from Perioral Muscles Activities and Vowel Production,' IEEE transactions on Biomedical Engineering, Vol.32, No.7, pp485-490" or JP-A-7-181888 or the like. Speech recognition based on image information can adopt the method disclosed in JP-A-2001-51693 or JP-A-2000-206986 or the like.

The speech recognizer 20 shown in FIG. 4 can recognize speech based on meaningful parameters, so as to improve noise immunity or the like in the overall speech recognition system substantially, when any parameter of the sound signal parameters, the EMG signal parameters, and the image information parameters are not meaningful to speech recognition, such as when the noise level is large in the surroundings, when the volume of a vocalized sound signal is small, or when the EMG signal is not detected.

Figure 5:
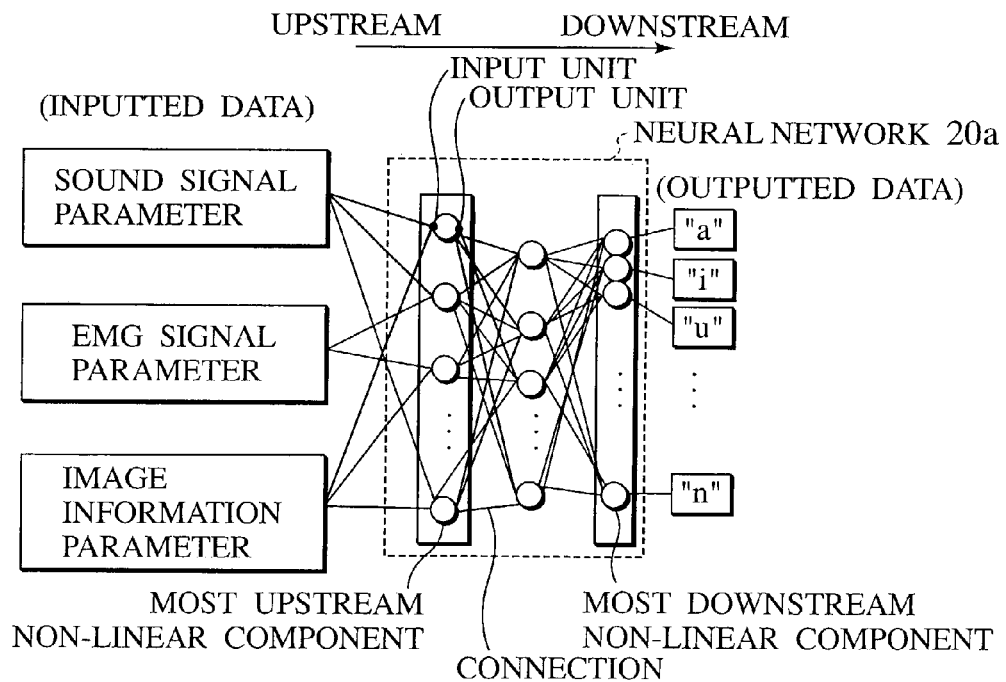
FIG. 5 is a functional block diagram of the speech recognizer in the speech recognition system according to the embodiment of the present invention.

Referring to FIG. 5, another example of the speech recognizer 20 will be described in detail. In the example shown in FIG. 5, the speech recognizer 20 recognizes the speech signal using the sound signal parameter, the EMG signal parameter and the image information parameter simultaneously.

To be more specific, the speech recognizer 20 comprises a hierarchical network (for example, neural network 20*a*) in which a plurality of non-linear components comprising an input unit and an output unit are located from upstream to downstream hierarchically.

In the neural network 20*a*, the output unit of the upstream non-linear component is connected to the input unit of the downstream non-linear component within adjacent non-linear components, a weight value is assigned to the connection or a combination of the connections, and each of the non-linear components calculates data which is outputted from the output unit and determines the connection to which the calculated data is outputted, in accordance with data inputted to the input unit and the weight value assigned to the connection or the combinations.

The sound signal parameters, the EMG signal parameters and the image information parameters are inputted to the most upstream non-linear components in the hierarchical network as the inputted data. The recognized speech signals (vowels and consonants) are outputted from the output unit of the most downstream non-linear components in the hierarchical network as the outputted data. The speech recognizer 20 recognizes the speech signal based on the data outputted from the output unit of the most downstream non-linear components.

The neural network can adopt the all-connected type of three-layer neural network, referring to "Nishikawa and Kitamura, 'Neural network and control of measure', Asakura Syoten, pp. 18-50".

The speech recognizer 20 comprises a learning function configured to change the weight assigned to the non-linear components by inputting sampling data which is transferred from downstream to upstream.

That is to say, it is necessary to learn the weight in the neural network 20*a* previously, by using the back-propagation method, for example.

In order to learn the weight, the speech recognizer 20 acquires sound signal parameters, EMG signal parameters and image information parameters generated according to the operation of vocalizing a specific pattern, and learns the weight by using the specific patterns as learning signals.

The EMG signal is inputted to the speech recognition system earlier than the sound signal and the image information when a speaker vocalizes, so that the speech recognizer 20 has the function of synchronizing the sound signal, the EMG signal and the image information, by delaying inputting only the EMG signal parameters to the neural network 20a as compared with the sound signal parameters and the image information parameters.

The neural network 20a which receives various parameters as input data outputs an phoneme relating to the inputted parameters.

The neural network 20a can adopt a recurrent neural network (RNN) which returns the next preceding recognition result as the input data. The speech recognition algorithm according to the embodiment can adopt various speech recognition algorithms other than a neural network, such as a Hidden Markov Model (HMM).

Figure 6:
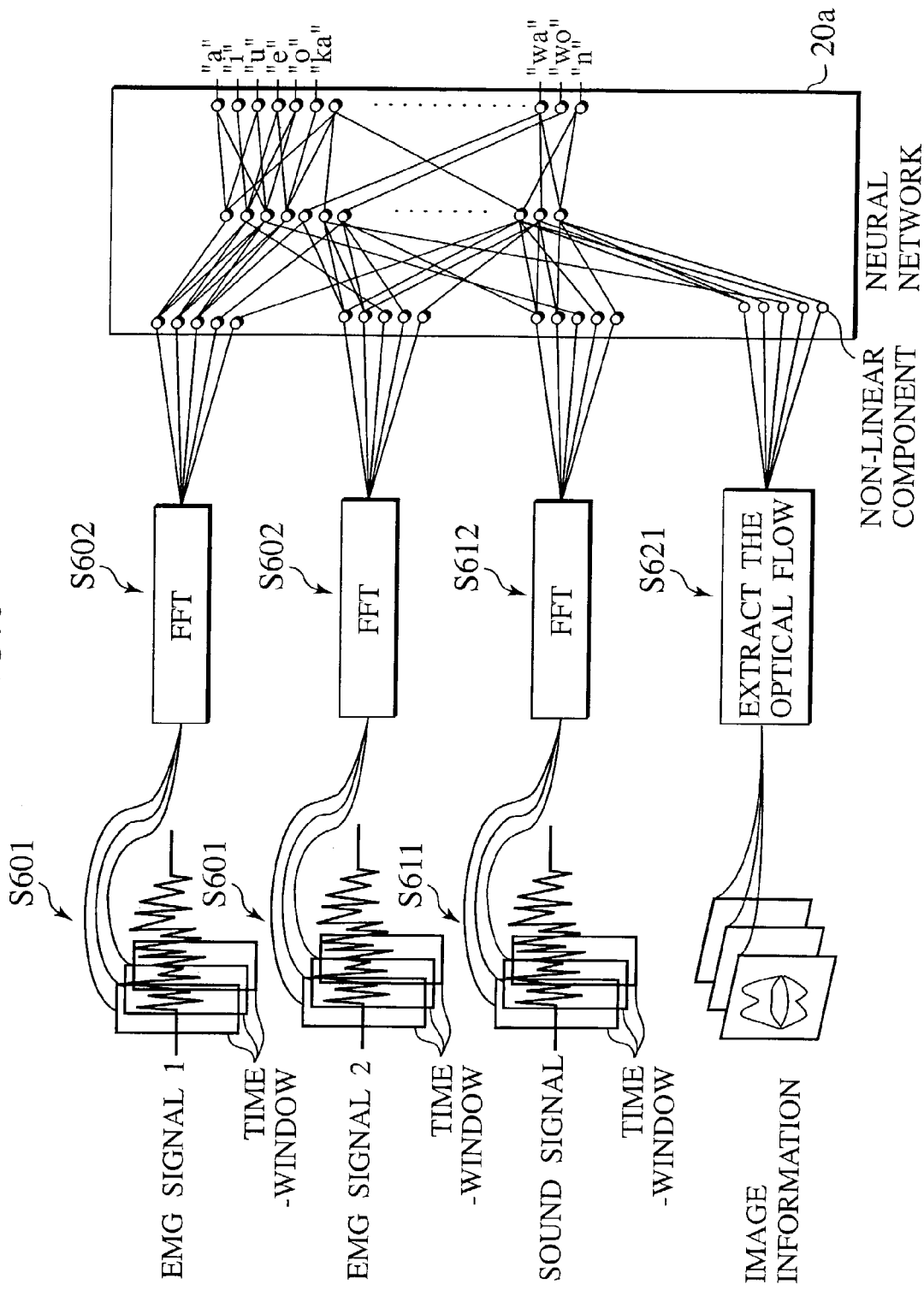
FIG. 6 is a view of details for explaining the speech recognizer in the speech recognition system according to the embodiment of the present invention.

Referring to FIG. 6, an operation of speech recognition in the speech recognizer shown in FIG. 5 will be described in detail.

As shown in FIG. 6, the plurality of EMG signals 1, 2 detected by the EMG signal acquiring unit 14 is amplified and cut per time-window in the EMG processing unit 15 (S601). The spectrums are calculated by performing an FFT on the cut EMG signals. The EMG signal parameters are calculated by performing a ⅓ octave analysis on the calculated spectrums (S602), before being inputted to the neural network 20a.

The sound signals detected by the sound signal acquiring unit 11 is amplified and cut per time-window in the sound processing unit 12 (S611). The spectrums are calculated by performing an FFT on the cut sound signals. The sound signal parameters are calculated by performing a ⅓ octave analysis on the calculated spectrums (S612), before being inputted to the neural network 20a.

The image information processing unit 18 extracts the motion of the feature position around the mouth as an optical flow, based on the image information detected by the image information acquiring unit 17 (S621). The image information parameters extracted as the optical flow are inputted to the neural network 20a.

It is possible to extract the respective feature position around the mouth within the image information shot in time series, so as to extract the motion of the feature position. Also it is possible to place markers on the feature point around the mouth, and a reference point, and to detect the displacement of the feature point relative to the reference point, so as to extract the motion of the feature position.

The neural network 20a into which the various parameters are inputted outputs the phoneme relating to the inputted parameters.

Further, the speech recognizer 20 according to the embodiment can be configured to recognize speech by using the speech recognition method in shown FIG. 5, when speech can not be recognized based on any parameters by using the speech recognition method in shown FIG. 4. The speech recognizer 20 can be configured to recognize speech, by comparing the results recognized by the speech recognition method shown in FIG. 4 with the results recognized by the speech recognition method shown in FIG. 5, or integrating them.

The recognition result provider 21 is a device for providing (outputting) the result recognized by the speech recognizer 20. The recognition result provider 21 can adopt a speech generator for outputting the result recognized by the speech recognizer 20 to a speaker as a speech signal, or a display for displaying the result as text information. The recognition result provider 21 can comprise a communication interface which transmits the result to an application executed in a terminal such as a personal computer as data, in addition to providing the result to the speaker.

(Operation of the Speech Recognition System According to the Embodiment)

Figure 7:
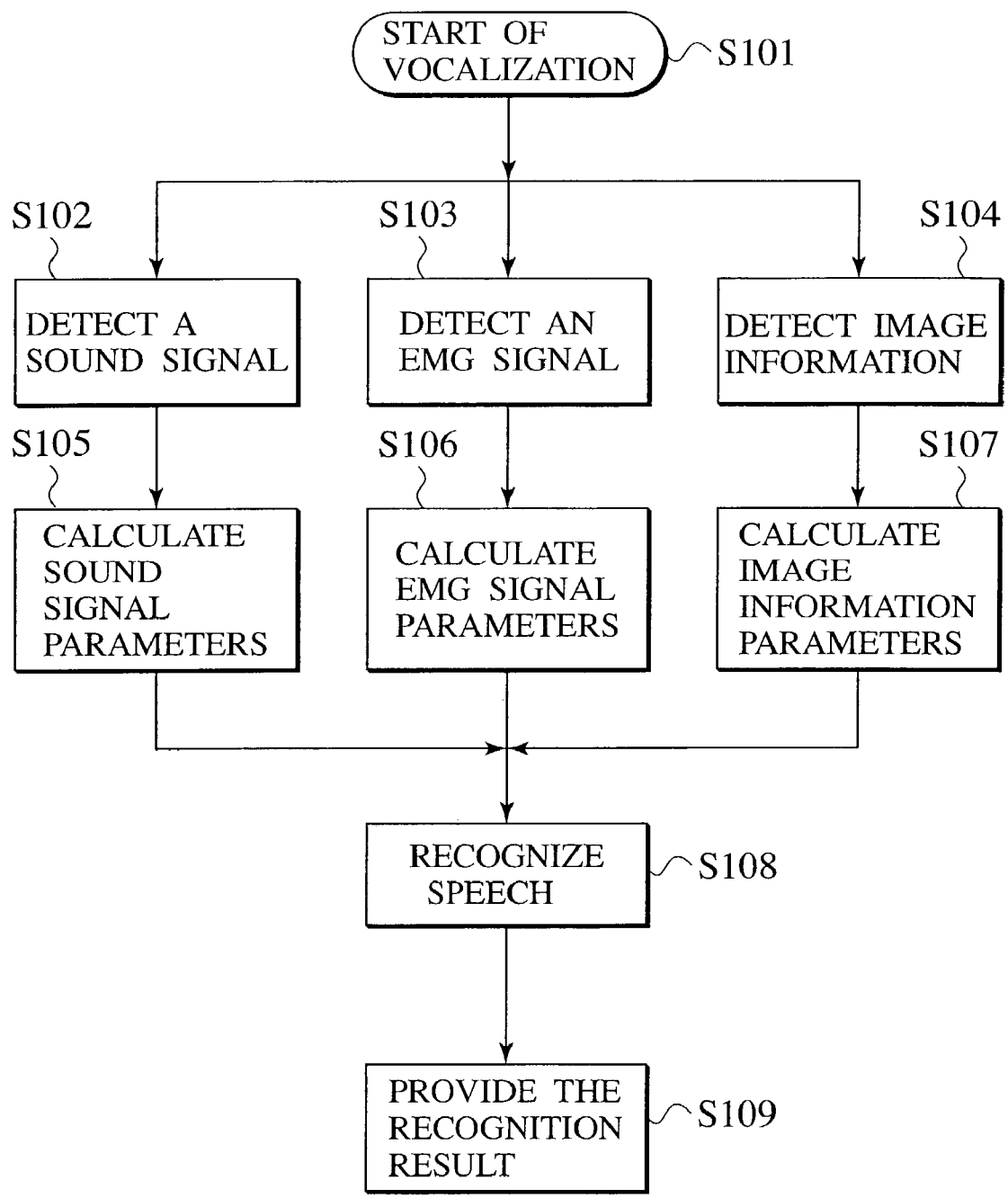
FIG. 7 is a flowchart illustrating the operation of a speech recognition process in the speech recognition system according to the embodiment of the present invention.

An operation of the speech recognition system according to the embodiment will be described with reference to FIGS. 7 and 8. First of all, referring to FIG. 7, an operation of the speech recognition process in the speech recognition system according to the embodiment.

In step 101, a speaker starts to vocalize. In step 102 to 104, the sound signal acquiring unit 11, the EMG signal acquiring unit 14 and the image information acquiring unit 17 detect the sound signal, the EMG signal and the image information generated respectively when the speaker vocalizes.

In step 105 to 107, the sound signal processing unit 12, the EMG signal processing unit 15 and the image information processing unit 18 calculate the sound signal parameters, the EMG signal parameters and the image information parameters respectively, based on the sound signal, the EMG signal and the image information.

In step 108, the speech recognizer 20 recognizes speech based on the calculated parameters. In step 109, the recognition result provider 21 provides the result recognized by the speech recognizer 20. The recognition result provider 21 can output the result as a speech signal or display the result.

Figure 8:
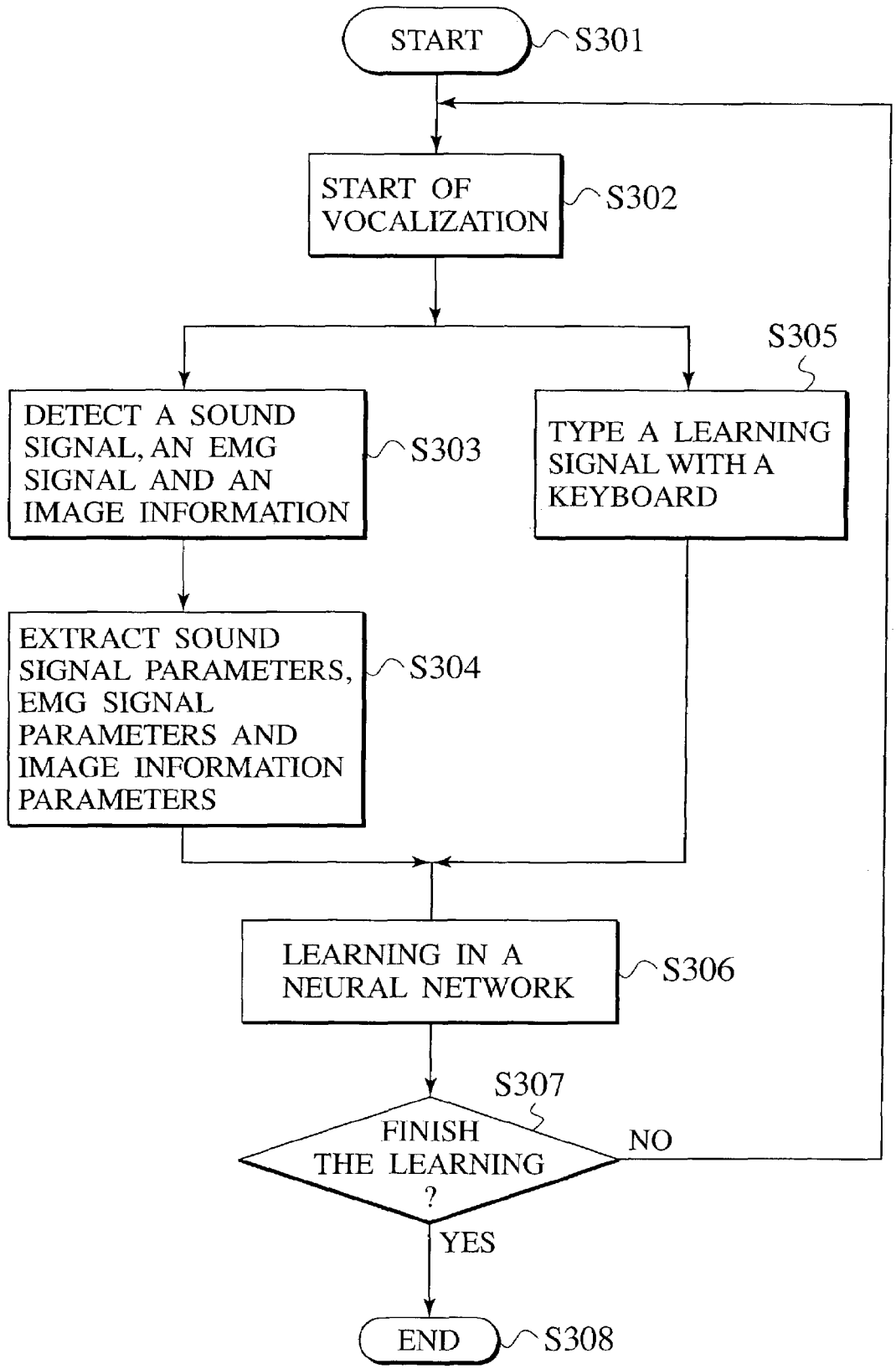
FIG. 8 is a flowchart illustrating the operation of a learning process in the speech recognition system according to the embodiment of the present invention.

Secondly, referring to FIG. 8, an operation of the learning process in the speech recognition system according to the embodiment.

It is important to learn the features of the vocalization of each speaker, so as to improve the recognition success rate. In the embodiment, the operation of the learning process using the neural network 20a shown in FIG. 5 will be described. In the case where a speech recognition method other than the neural network 20a is used, the speech recognition system according to the present invention adopts the learning function relating to the speech recognition method.

As shown in FIG. 8, in step 801 and 802, a speaker starts to vocalize. In step 805, the speaker types to input the vocalized contents with a keyboard or the like, that is to say, a learning signal (sampling data) while vocalizing. In step 303, the sound signal acquiring unit 11, the EMG signal acquiring unit 14 and the image information acquiring unit 17 detect the sound signal, the EMG signal and the image information respectively. In step 304, the sound signal processing unit 12, the EMG signal processing unit 15 and the image information processing unit 18 extract the sound signal parameters, the EMG signal parameters and the image information parameters respectively.

In step 306, the neural network 20a learns the extracted parameters based on the learning signal inputted by the keyboard. That is to say, the neural network 20a changes the weights assigned to non-linear components by inputting a learning signal (sampling data) which is transferred from downstream to upstream.

In step 307, the neural network 20a determines that the learning process is finished when the error rate in recognition is less than a threshold. Then the operation ends (S308).

On the other hand, in step S307, when the neural network 20a determines that the learning process is not finished, the operation repeats the steps 302 to 306.

(The Functions and Effects of the Speech Recognition System According to the Embodiment)

The speech recognition system of this embodiment can recognize speech based on a plurality of parameters calculated from the sound signal, the EMG signal and the image information, so as to improve noise immunity or the like substantially.

That is to say, the speech recognition system of this embodiment comprises three types of input interfaces (a sound signal processor 10, an EMG signal processor 13 and an image information processor 16) for improving noise immunity. When all the input interfaces are not available, the speech recognition system can recognize speech using the available input interfaces, so as to improve the recognition success rate.

Therefore, the present invention can provide a speech recognition system which can recognize speech at adequate levels, when the noise level is large in the surroundings, or when the volume of a vocalized sound signal is small.

(A Speech Synthesis System According to a Second Embodiment of the Present Invention)

Figure 9:
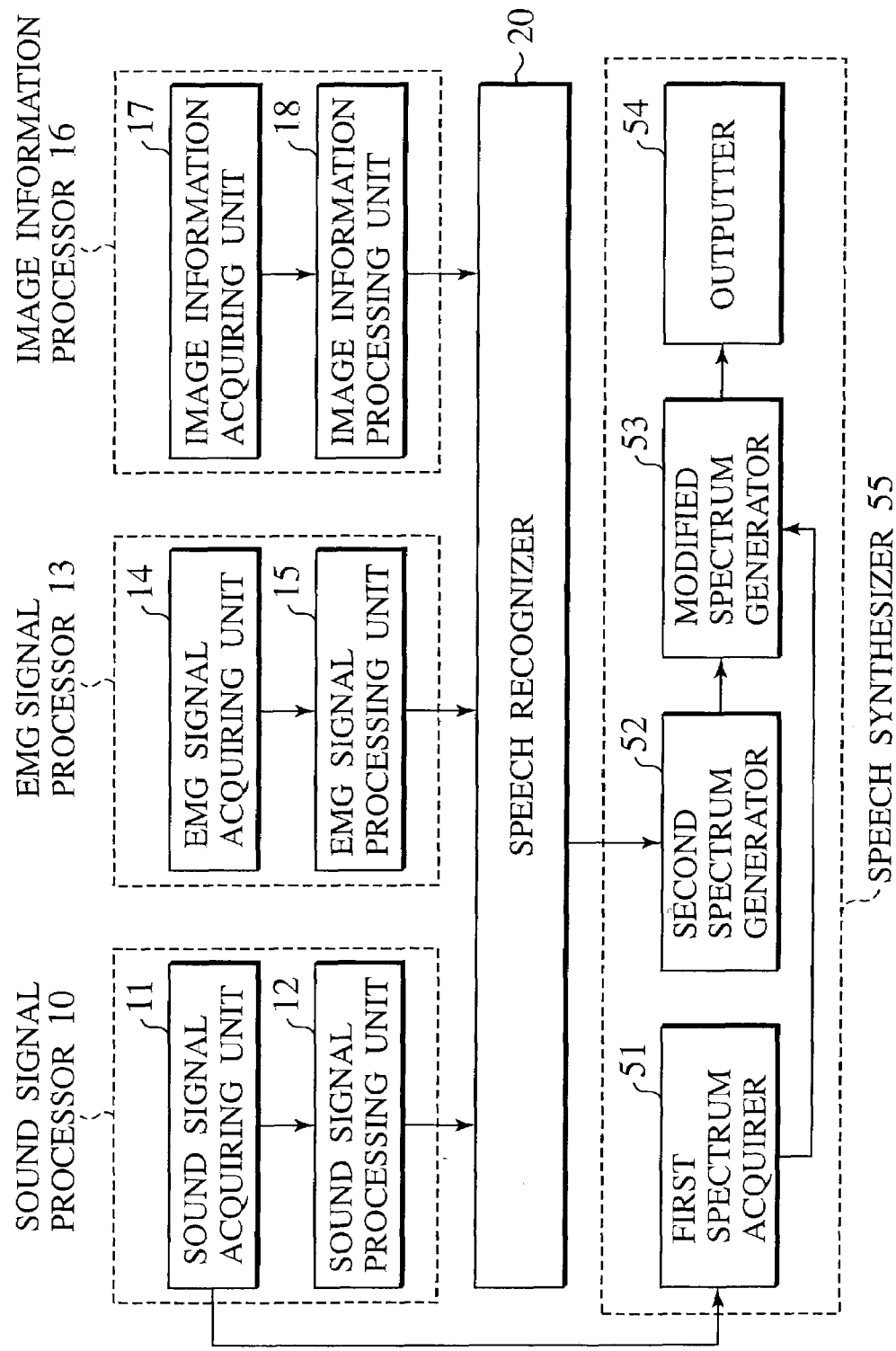
FIG. 9 is a functional block diagram of the speech synthesis system according to the embodiment of the present invention.
Figure 11:
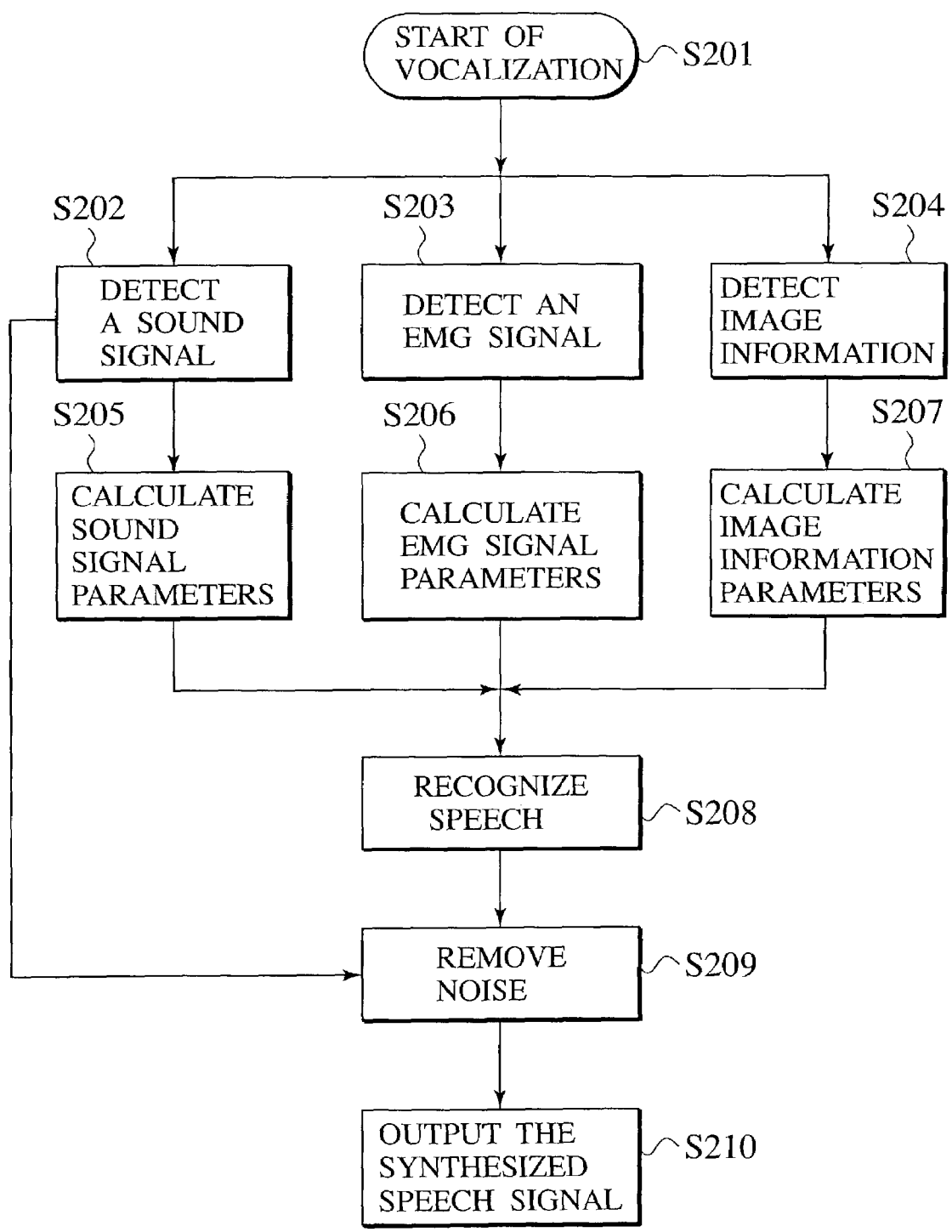
FIG. 11 is a flowchart illustrating the operation of a speech synthesis process in the speech synthesis system according to the embodiment of the present invention.

Referring to FIGS. 9 to 11, the speech synthesis system according to second embodiment of the present invention will be described. The above-described speech recognition system is applied to the speech synthesis system according to the embodiment.

As shown in FIG. 9, the speech synthesis system according to the embodiment is configured with a sound signal processor 10, an EMG signal processor 13, an image information processor 16, a speech recognizer 20 and a speech synthesizer 55. The speech synthesizer 55 is configured with a first spectrum acquirer 51, a second spectrum generator 52, a modified spectrum generator 53 and an outputter 54.

The functions of the sound signal processor 10, the EMG signal processor 13, the image information processor 16 and the speech recognizer 20, are the same functions as the speech recognition system according to the first embodiment.

The first spectrum acquirer 51 is configured to acquire a spectrum of the sound signal acquired by the sound signal acquiring unit 11 as a first spectrum. The acquired first spectrum includes noise contents (referring to FIG. 10C).

The second spectrum generator 52 is configured to generate a reconfigured spectrum of the sound signal, based on the speech signal (result) recognized by the speech recognizer 20, as a second spectrum. As shown in FIG. 10A, to be more specific, the second spectrum generator 52 reconfigures the spectrum of vocalized phonemes based on the features of the vocalized phonemes, such as a Formant Frequency, which is extracted from the result recognized by the speech recognizer 20.

The modified spectrum generator 53 is configured to generate a modified spectrum in accordance with the first spectrum and the second spectrum. As shown in FIG. 10D, to be more specific, the modified spectrum generator 53 generates the modified spectrum without noise, by multiplying the first spectrum (referring to FIG. 10C) by the second spectrum (referring to FIG. 10A).

The outputter 54 is configured to output a synthesized speech signal based on the modified spectrum. The outputter 54 can comprise a communicator configured to transmit the synthesized speech signal as data. As shown in FIG. 10C, to be more specific, the outputter 54 obtains the sound signal without noise contents by performing a Fourier inverse transform on the modified spectrum without noise contents (referring to FIG. 10D), and outputs the obtained sound signal as a synthesized speech signal.

That is to say, the speech synthesis system according to the embodiment obtains the sound signal without noise by passing the sound signal including noise via a filter which has frequency characteristics being represented by the reconfigured spectrum, and outputs the obtained sound signal.

The speech synthesis system according to the embodiment can separate the sound signal vocalized by the speaker and surrounding noise, from the signal reconfigured from the recognition result and the sound signal detected by the sound signal acquiring unit 11, by recognizing speech with various methods, so as to output a clear synthesized speech signal when the noise level is large in the surroundings.

Therefore, the speech synthesis system according to the embodiment can output the synthesized speech signal which is listened to as if the speaker was vocalizing in an environment without noise, when the noise level is large, or when the volume of a vocalized sound signal is small.

The speech synthesis system according to the embodiment adopts the speech recognition system according to the first embodiment, however, the present invention is not limited to the embodiment. The speech synthesis system according to the embodiment can recognize speech based on parameters other than the sound signal parameters.

Referring to FIG. 11, an operation of the speech synthesis system according to the embodiment will be described.

As shown in FIG. 11, in steps 201 to 208, the same speech recognition process as the first embodiment is performed.

In step 209, the first spectrum acquirer 51 acquires a spectrum of the sound signal acquired by the sound signal acquiring unit 11 as a first spectrum. The second spectrum generator 52 generates a reconfigured spectrum of the sound signal, based on the result recognized by the speech recognizer 20, as a second spectrum. The modified spectrum generator 53 generates a modified spectrum, in which noise (other than the sound signal vocalized by the speaker) is removed from the sound signal acquired by the sound signal acquiring unit 11, in accordance with the first spectrum and the second spectrum.

In step 210, the outputter 54 outputs a clear synthesized speech synthesized signal based on the modified spectrum.

(A System According to a Third Embodiment of the Present Invention)

Figure 12:
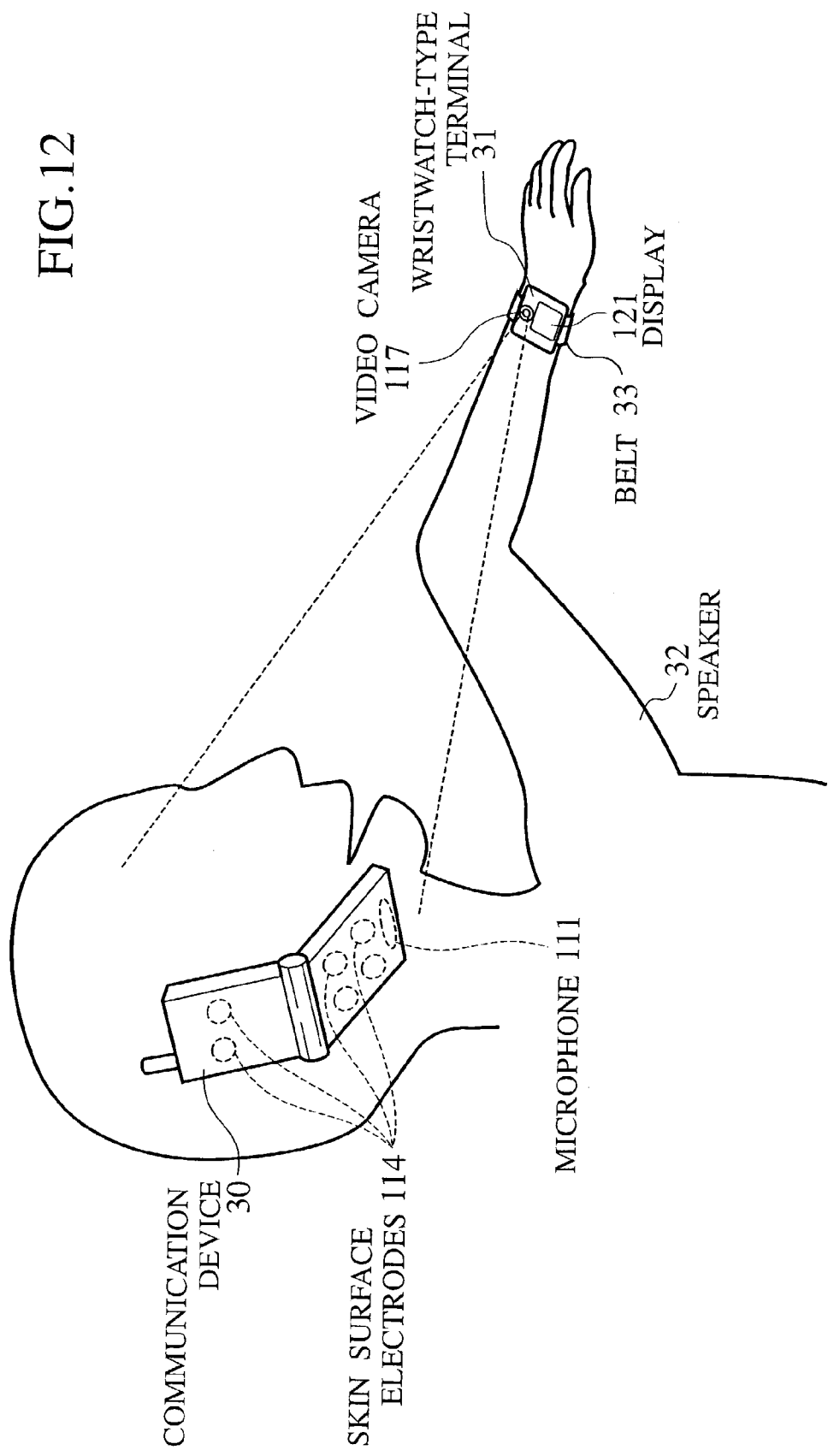
FIG. 12 is an entire configuration of the system for integrating the speech recognition system and the speech synthesis system according to the embodiment of the present invention.

Referring to FIG. 12, a system for integrating the speech recognition system and the speech synthesis system according to the embodiment will be described.

As shown in FIG. 12, the system according to the embodiment is configured with a communications device 30 and a wristwatch-type terminal 31 separated from the communications device 30.

The communications terminal 30 is configured to add the sound signal processor 10, the EMG signal processor 13, the speech recognizer 20 and the speech synthesizer 55 to the conventional mobile terminal.

The EMG signal acquiring unit 14 comprises a plurality of skin surface electrodes 114, which are installed so as to be able to contact with the skin of the speaker 32, and configured to acquire the potential changes on the surface around the mouth of the speaker (the sound source) 32 as the EMG signal. The sound signal acquiring unit 11 comprises a microphone 111 configured to acquire the sound signal from the mouth of the speaker (the sound source) 32. The microphone 111 can be configured to communicate with a communications device 30. For example, the microphone 111 can be installed on a surface of the communications device 30. The microphone 111 can be a wireless-type microphone installed adjacent to the mouth of the speaker 32. The skin surface electrodes 114 can be installed on a surface of the communications device 30.

The communications terminal 30 has the function of transmitting the synthesized speech signal based on the result recognized by the speech recognizer 20 as the sound signal vocalized by the speaker 32.

The wristwatch-type terminal 31 is configured with the image information processor 16 and the recognition result processor 21. A video camera 117 for taking an image of the motion of the mouth of the speaker (the sound source) 32 is installed at the body of the wristwatch-type terminal 31 as the image information acquiring unit 17. A display 121 for displaying the recognition result is installed on the surface of the body of the wristwatch-type terminal 31 as the recognition result provider 21. The wristwatch-type terminal 13 comprise a belt 33 for fixing the body of the wristwatch-type terminal 13.

The system for integrating the speech recognition system and the speech synthesis system acquires the EMG signal and the sound signal by the EMG signal acquiring unit 14 and the sound signal acquiring unit 11, which are installed at the communications device 30, and acquires the image information by the image information acquiring unit 17, which is installed on the body of the wristwatch-type terminal 31.

The communications device 30 transmits and receives data with the wristwatch-type terminal 31 via wired communications or wireless communications. The communications device 30 and the wristwatch-type terminal 31 collects and sends the signals to the speech recognizer 20 built into the communications device 30, the speech recognizer 20 recognizes speech based on the collected signals, the recognition result provider 21 installed in the wristwatch-type terminal 31 displays the recognition result transmitted from the speech recognizer 20 via wired communications or wireless communications. The communications device 30 can transmit a clear synthesized speech signal without noise to the wristwatch-type terminal 31.

In the embodiment, the speech recognizer 20 is built into the communications device 30, and the recognition result provider 21 built into the wristwatch-type terminal 31 displays the recognition result. However, the speech recognizer 20 may be installed in the wristwatch-type terminal 31, or another terminal which can communicate with the communications device 30, and the wristwatch-type terminal 31 can recognize and synthesize speech.

The recognition result can be outputted from the communications device as a speech signal, can be displayed on the monitor of the wristwatch-type terminal 31 (or the communications device 30), or can be outputted from another terminal which can communicate with the communications device 30 and the wristwatch-type terminal 31.

(A System According to a Fourth Embodiment of the Present Invention)

Figure 13:
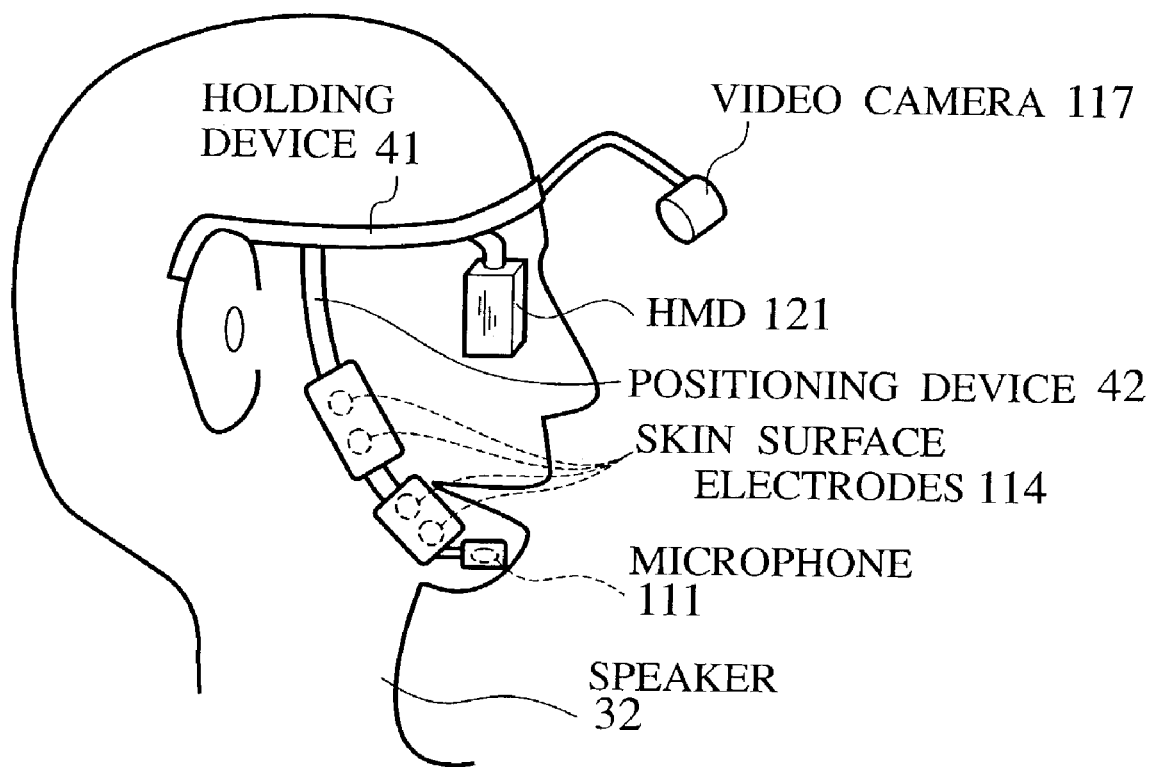
FIG. 13 is an entire configuration of the system for integrating the speech recognition system and the speech synthesis system according to the embodiment of the present invention.

Referring to FIG. 13, the system for integrating the speech recognition system and the speech synthesis system according to the embodiment will be described.

As shown in FIG. 13, the system according to the embodiment is configured with a holding device 41 in the form of glasses, a video camera 117 as the image information acquiring unit 17 which is held adapted to take an image of the motion of the mouth of the speaker (the sound source) 32, a positioning device 42, a Head Mounted Display (HMD) 121 as the recognition result provider 12, and the speech recognizer 20 built into the holding device 41. The holding device 41 can be mounted to the head of the speaker 32.

The skin surface electrodes 114, as the EMG signal acquiring unit 14 configured to acquire the potential changes on a surface around the mouth of the speaker 32 (the sound source), and the microphone 111, as the sound signal acquiring unit 11 configured to acquire the sound signal from the mouth of the speaker 32 (the sound source) are attached adapted to be fixed to the surroundings of the mouth of the speaker 32.

The speaker 32 wearing the system according to the embodiment can recognize and synthesize speech, having his/her hands free.

The speech recognizer 20 can be built in the holding device instrument 41 or an outer terminal which can communicate with the holding device instrument 41. The recognition result can be displayed in an HMD (translucent display), or can be outputted from an output device such as a speaker device as a speech signal, or can be outputted from an outer terminal. The output device such as a speaker device can output the synthesized speech signal based on the recognition result.

(A Program According to a Fifth Embodiment of the Present Invention)

The speech recognition system, the speech recognition method, the speech synthesis system or the speech synthesis method according to the above embodiment can be achieved by executing a program described in the predetermined program language on a general-purpose computer (for example, a personal computer) 215 or an IC chip included in the communications device 30 (for example, a mobile terminal) or the like.

Figure 14:
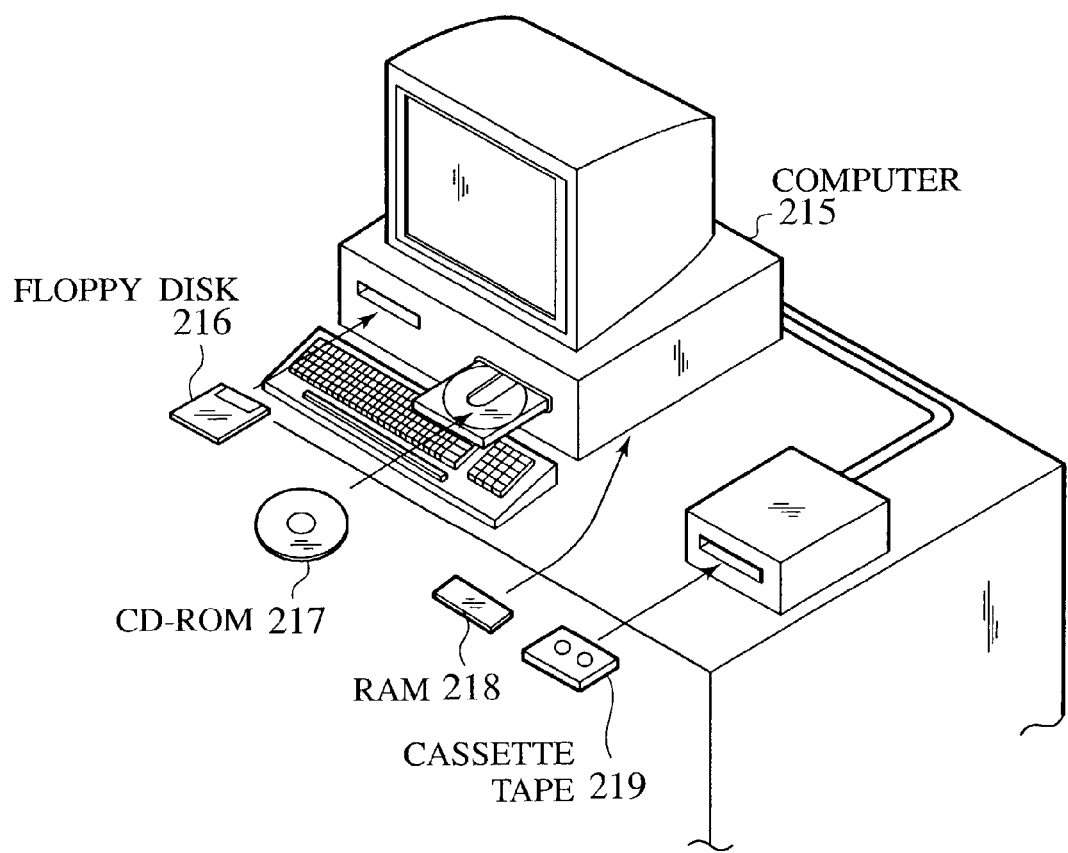
FIG. 14 shows a computer-readable recording medium in which a program according to the embodiment of the present invention is recorded.

Further, the program can be recorded in a storage medium which can be read by a general-purpose computer 215 as shown in FIG. 14. That is, as shown in FIG. 14, the program can be stored on a floppy disk 216, a CD-ROM 217, a RAM 218, a cassette tape 219 or the like. The system or method according to the present invention can be achieved by inserting the storing media including the program into the computer 215 or installing the program to the memory of the communications device 30 or the like.

(The Functions and Effects of the Present Invention)

The speech recognition system, method, and program according to the present invention can maintain a high success rate in recognition with a low-volume of sound signal without being affected by noise.

The speech synthesis system, method, and program according to the present invention can synthesize a speech signal using the recognized speech signal, so as to make the synthesized speech signal more natural and clear, and to express the emotions of a speaker or the like appropriately.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A speech recognition system, comprising:
a sound signal processor configured to acquire a sound signal from an object, and to calculate a sound signal parameter based on the acquired sound signal;
an electromyographic signal processor configured to acquire potential changes on a surface of the object as an electromyographic signal, and to calculate an electromyographic signal parameter based on the acquired electromyographic signal;
an image information processor configured to acquire image information by taking an image of the object, and to calculate an image information parameter based on the acquired image information;
a speech recognizer configured to recognize a speech signal vocalized by the object, based on the sound signal parameter, the electromyographic signal parameter, and the image information parameter, wherein
the speech recognizer includes a hierarchical network in which a plurality of non-linear components including an input unit and an output unit are located from upstream to downstream hierarchically;
the output unit of the upstream non-linear component is connected to the input unit of the downstream non-linear component within adjacent non-linear components;
a weight value is assigned to the connection or a combination of the connections,
each of the non-linear components is configured to calculate data which is outputted from the output unit and to determine the connection to which the calculated data is outputted, in accordance with data inputted to the input unit and the weight value assigned to the connection or the combination,
the sound signal parameter, the electromyographic signal parameter, and the image information parameter are inputted to the most upstream non-linear components in the hierarchical network as the inputted data,
the recognized speech signals are outputted from the output unit of the most downstream non-linear components in the hierarchical network as the outputted data; and
the speech recognizer recognizes the speech signal based on the outputted data; and
a recognition result provider configured to provide a result recognized by the speech recognizer.

2. The speech recognition system according to claim 1, wherein the speech recognizer is configured to recognize the speech signal based on each of the sound signal parameter, the electromyographic signal parameter, and the image information parameter, to compare each of the recognized speech signals, and to recognize the speech signal based on the compared result.

3. The speech recognition system according to claim 1, wherein the speech recognizer is configured to recognize the speech signal using the sound signal parameter, the electromyographic signal parameter, and the image information parameter simultaneously.

4. The speech recognition system according to claim 1, wherein the speech recognizer includes a learning function configured to change the weight assigned to the non-linear components by inputting sampling data which is transferred from downstream to upstream.

5. The speech recognition system according to claim 1, the system further comprising:
a positioning device and a holding device; wherein
the sound signal processor includes a microphone configured to acquire the sound signal from a sound source;
the electromyographic signal processor includes electrodes configured to acquire the potential changes on a surface around the sound source as the electromyographic signal;
the image information processor includes a camera configured to acquire the image information by taking an image of the motion of the sound source;
the positioning device fixes the microphone and the electrodes adjacent to the sound source; and
the holding device holds the camera and the positioning device.

6. The speech recognition system according to claim 1, wherein the speech recognizer is configured to recognize a predetermined phoneme or pattern, and to recognize the speech signal based only on the sound signal parameter when the predetermined phoneme or pattern is recognized.

7. The speech recognition system according to claim 1, wherein the speech recognizer is configured to recognize a predetermined phoneme or pattern, and to ignore the electromyographic signal parameter when the predetermined phoneme or pattern is recognized.

8. The speech recognition system according to claim 1, wherein the speech recognizer is configured to recognize the speech signal based only on the sound signal parameter, when speech based on the sound signal parameter is recognized above a predetermined level.

9. The speech recognition system according to claim 1, wherein
the sound signal processor includes a microphone configured to acquire the sound signal from a sound source, the microphone configured to communicate with a communications device;
the electromyographic signal processor includes electrodes configured to acquire the potential changes on a surface around the sound source as the electromyographic signal, the electrodes being installed on a surface of the communications device;
the image information processor includes a camera configured to acquire the image information by taking an image of the motion of the sound source, the camera being installed on a terminal separated from the communications device; and
the communications device is configured to transmit and to receive data from the terminal.

10. The speech recognition system according to claim 9, wherein
the terminal includes a body on which the camera is installed, and a belt for fixing the body; and
the recognition result provider is a display configured to display the result, the display being installed on a surface of the body.

11. The speech recognition system according to claim 9, wherein the recognition result provider is configured to display the result in a translucent display, the recognition result provider being installed in the holding device.

12. A speech recognition method, comprising:
acquiring a sound signal from an object, and calculating a sound signal parameter based on the acquired sound signal;

acquiring potential changes on a surface of the object as an electromyographic signal, and calculating an electromyographic signal parameter based on the acquired electromyographic signal;

acquiring image information by taking an image of the object, and calculating an image information parameter based on the acquired image information;

recognizing a speech signal vocalized by the object using a speech recognizer, based on the sound signal parameter, the electromyographic signal parameter, and the image information parameter, the speech recognizer including a hierarchical network in which a plurality of non-linear components including an input unit and an output unit are located from upstream to downstream hierarchically, wherein recognizing a speech signal vocalized by the object includes connecting the output unit of the upstream non-linear component to the input unit of the downstream non-linear component within adjacent non-linear components, assigning a weight value to the connection or a combination of the connections, calculating data which is outputted from the output unit and determining the connection to which the calculated data is outputted with each of the non-linear components, in accordance with data inputted to the input unit and the weight value assigned to the connection or the combination, inputting the sound signal parameter, the electromyographic signal parameter, and the image information parameter to the most upstream non-linear components in the hierarchical network as the inputted data, outputting the recognized speech signals from the output unit of the most downstream non-linear components in the hierarchical network as the outputted data, and recognizing the speech signal based on the outputted data; and providing a result recognized by the recognizing.

13. A computer readable medium encoded with computer executable instructions, wherein the instructions, when executed by a processor, cause the processor to perform a method, comprising:

acquiring a sound signal from an object, and calculating a sound signal parameter based on the acquired sound signal;

acquiring potential changes on a surface of the object as an electromyographic signal, and calculating an electromyographic signal parameter based on the acquired electromyographic signal;

acquiring image information by taking an image of the object, and calculating an image information parameter based on the acquired image information;

recognizing a speech signal vocalized by the object using a speech recognizer, based on the sound signal parameter, the electromyographic signal parameter, and the image information parameter, the speech recognizer including a hierarchical network in which a plurality of non-linear components including an input unit and an output unit are located from upstream to downstream hierarchically, wherein recognizing a speech signal vocalized by the object includes connecting the output unit of the upstream non-linear component to the input unit of the downstream non-linear component within adjacent non-linear components, assigning a weight value to the connection or a combination of the connections, calculating data which is outputted from the output unit and determining the connection to which the calculated data is outputted with each of the non-linear components, in accordance with data inputted to the input unit and the weight value assigned to the connection or the combination, inputting the sound signal parameter, the electromyographic signal parameter, and the image information parameter to the most upstream non-linear components in the hierarchical network as the inputted data, outputting the recognized speech signals from the output unit of the most downstream non-linear components in the hierarchical network as the outputted data, and recognizing the speech signal based on the outputted data; and providing a result recognized by the recognizing.

* * * * *